US008245795B2

(12) United States Patent
Dennis

(10) Patent No.: US 8,245,795 B2

(45) Date of Patent: Aug. 21, 2012

(54) PHASE WELLBORE STEERING

(75) Inventor: Mark Kenneth Dennis, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 325 days.

(21) Appl. No.: 12/633,192

(22) Filed: Dec. 8, 2009

(65) Prior Publication Data

US 2011/0132662 A1 Jun. 9, 2011

(51) Int. Cl.
*E21B 44/00* (2006.01)

(52) U.S. Cl. ............................... 175/45; 175/61; 702/10

(58) Field of Classification Search .................... 175/45, 175/61, 62; 702/10

See application file for complete search history.

(56) References Cited

U.S. PATENT DOCUMENTS

| | | | |
|---|---|---|---|
| 4,791,619 A | 12/1988 | Liu | |
| 5,678,643 A | 10/1997 | Robbins | |
| 6,464,021 B1 | 10/2002 | Edwards et al. | |
| 7,069,780 B2 | 7/2006 | Ander | |
| 2008/0175099 A1 | 7/2008 | Hawthorn | |
| 2011/0208666 A1* | 8/2011 | Akhnoukh et al. | 705/328 |

FOREIGN PATENT DOCUMENTS

| | | |
|---|---|---|
| GB | 2418734 | 4/2006 |
| WO | 02/39143 | 5/2002 |
| WO | 03/071097 | 8/2003 |

* cited by examiner

*Primary Examiner* — William P Neuder

(74) *Attorney, Agent, or Firm* — Colin L. Wier

(57) ABSTRACT

A method of steering a drilling operation of a well using acoustic measurements. The method includes obtaining, using a central processing unit (CPU), a clean-wet matrix line for the well, where the clean-wet matrix line includes a number of normal compressional values, obtaining, using the CPU, the acoustic measurements from at least one logging while drilling tool at a current depth of the drilling operation, where the acoustic measurements include a compressional to shear velocity ratio and a delta-T compressional measurement, and determining, using the CPU, a current phase of the drilling operation by comparing the acoustic measurements to the clean-wet matrix line. The method further includes, in response to determining that the current phase is not a target phase, generating an updated well trajectory for steering the drilling operation toward the target phase and adjusting the drilling operation using the updated well trajectory.

17 Claims, 8 Drawing Sheets

100
101
103
102-2
106-1
106-2
102-4
108-4
Q
t
108-2
107
108-1
104
102-1
106-3
106-4
102-3
108-3

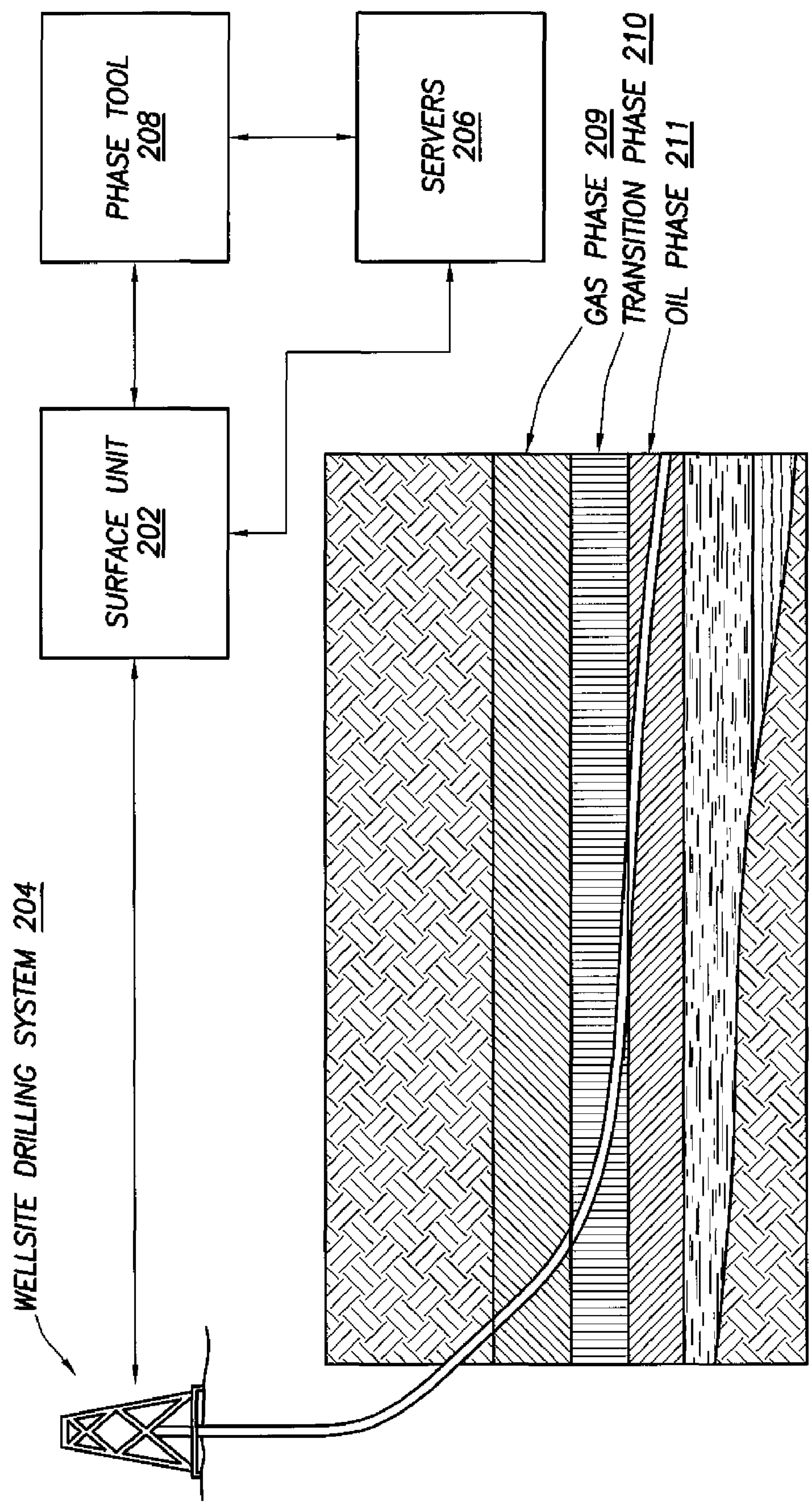
FIG.2.1

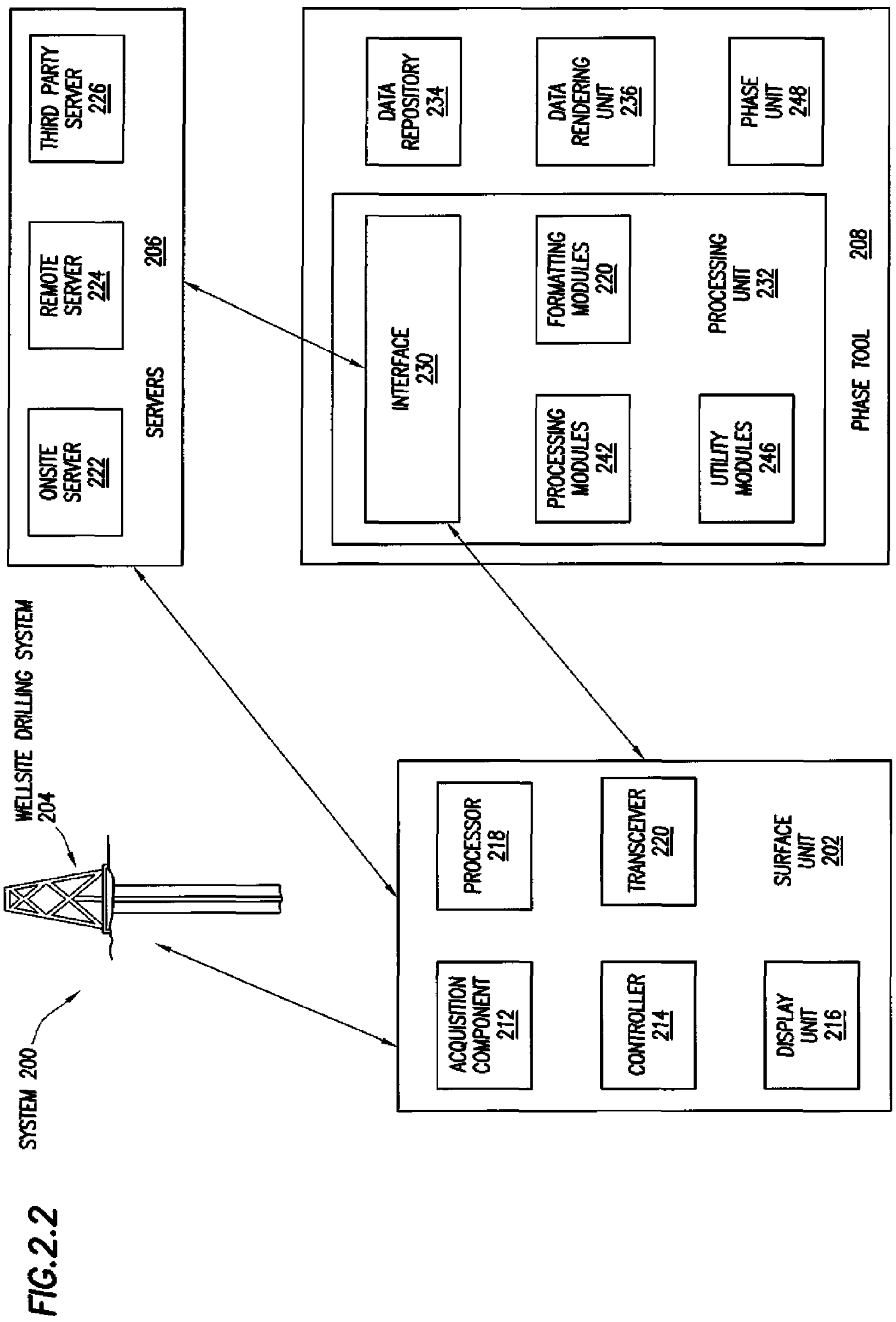
FIG.2.2
SYSTEM 200
WELLSITE DRILLING SYSTEM 204
ONSITE SERVER 222
REMOTE SERVER 224
THIRD PARTY SERVER 226
SERVERS 206
INTERFACE 230
PROCESSING MODULES 242
FORMATTING MODULES 220
UTILITY MODULES 246
PROCESSING UNIT 232
DATA REPOSITORY 234
DATA RENDERING UNIT 236
PHASE UNIT 248
PHASE TOOL 208
ACQUISITION COMPONENT 212
PROCESSOR 218
CONTROLLER 214
TRANSCEIVER 220
DISPLAY UNIT 216
SURFACE UNIT 202

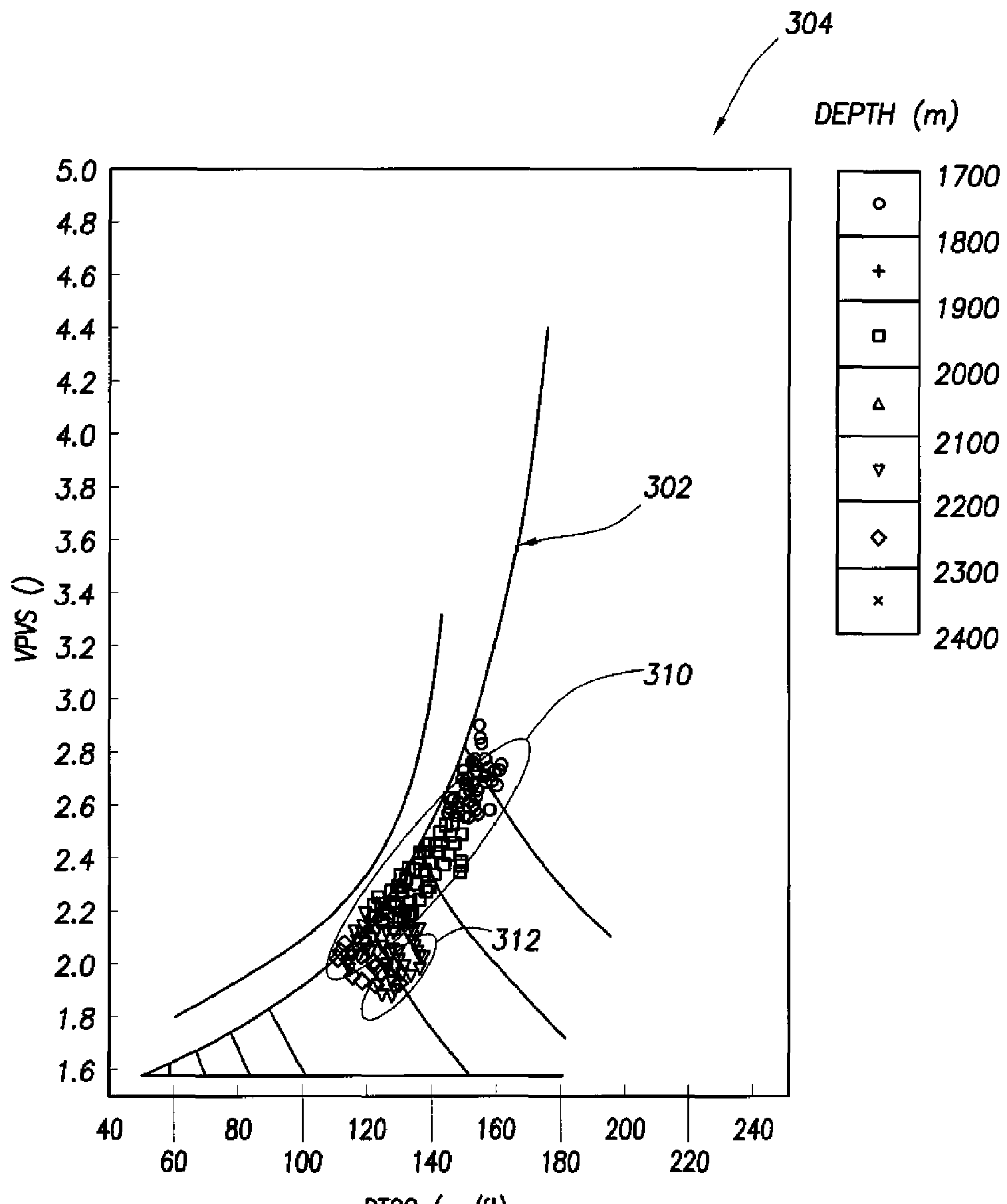
FIG.3.1

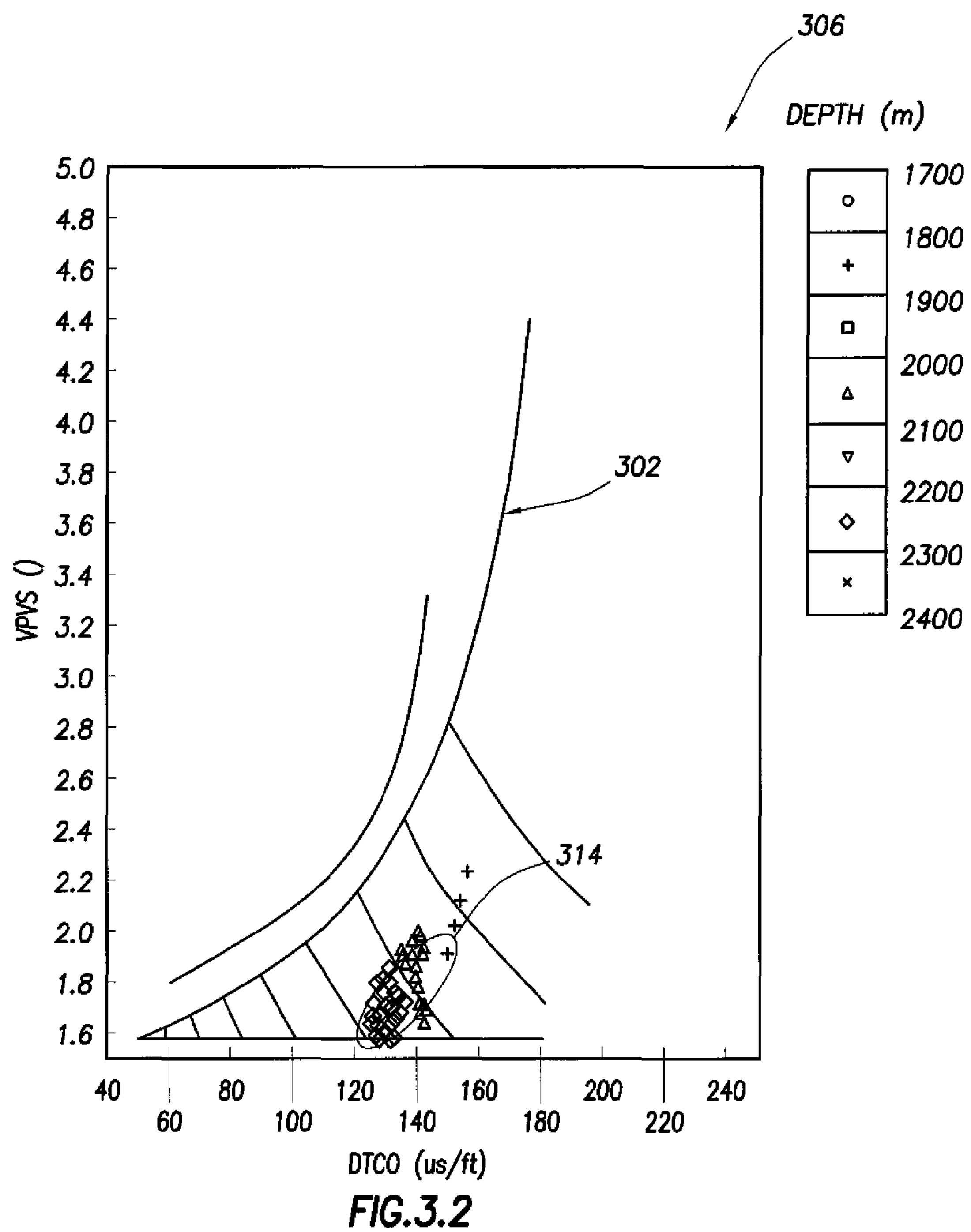
FIG.3.2

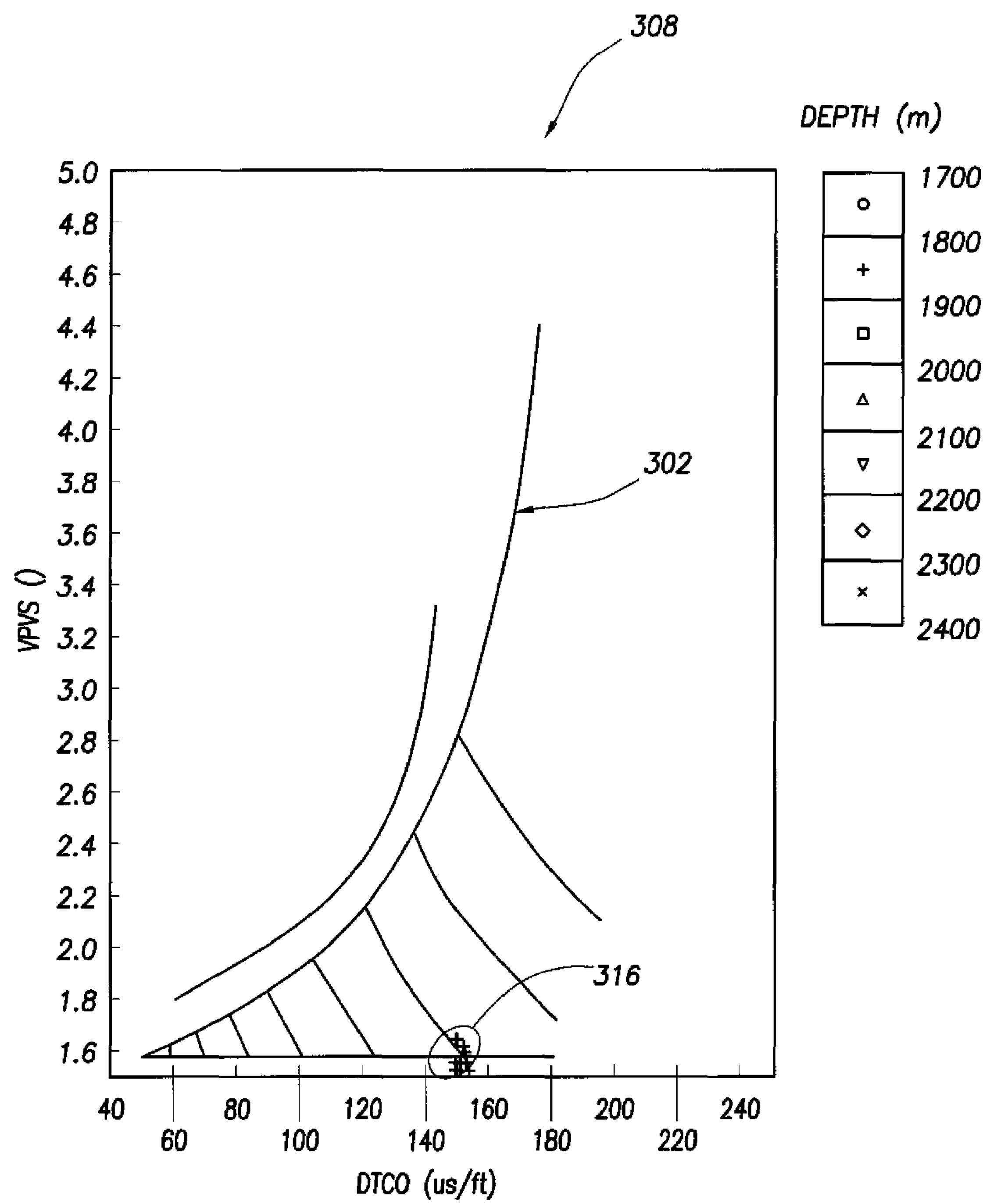
FIG.3.3

PHASE WELLBORE STEERING

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

SUMMARY

In one or more implementations of steering a drilling operation of a well using acoustic measurements, the method includes obtaining, using a central processing unit (CPU), a clean-wet matrix line for the well, where the clean-wet matrix line includes a number of normal compressional values, obtaining, using the CPU, the acoustic measurements from at least one logging while drilling tool at a current depth of the drilling operation, where the acoustic measurements include a compressional to shear velocity ratio and a delta-T compressional measurement, and determining, using the CPU, a current phase of the drilling operation by comparing the acoustic measurements to the clean-wet matrix line. The method further includes, in response to determining that the current phase is not a target phase, generating an updated well trajectory for steering the drilling operation toward the target phase and adjusting the drilling operation using the updated well trajectory.

Other aspects of phase wellbore steering will be apparent from the following description and the appended claims.

BRIEF DESCRIPTION OF THE DRAWINGS

The appended drawings illustrate several embodiments of phase wellbore steering and are not to be considered limiting of its scope, for phase wellbore steering may admit to other equally effective embodiments.

FIGS. 2.1-2.2 depict a system in which one or more embodiments of phase wellbore steering may be implemented.

FIGS. 3.1-3.3 depict example crossplots for phase wellbore steering in accordance with one or more embodiments

DETAILED DESCRIPTION

Figure 1:
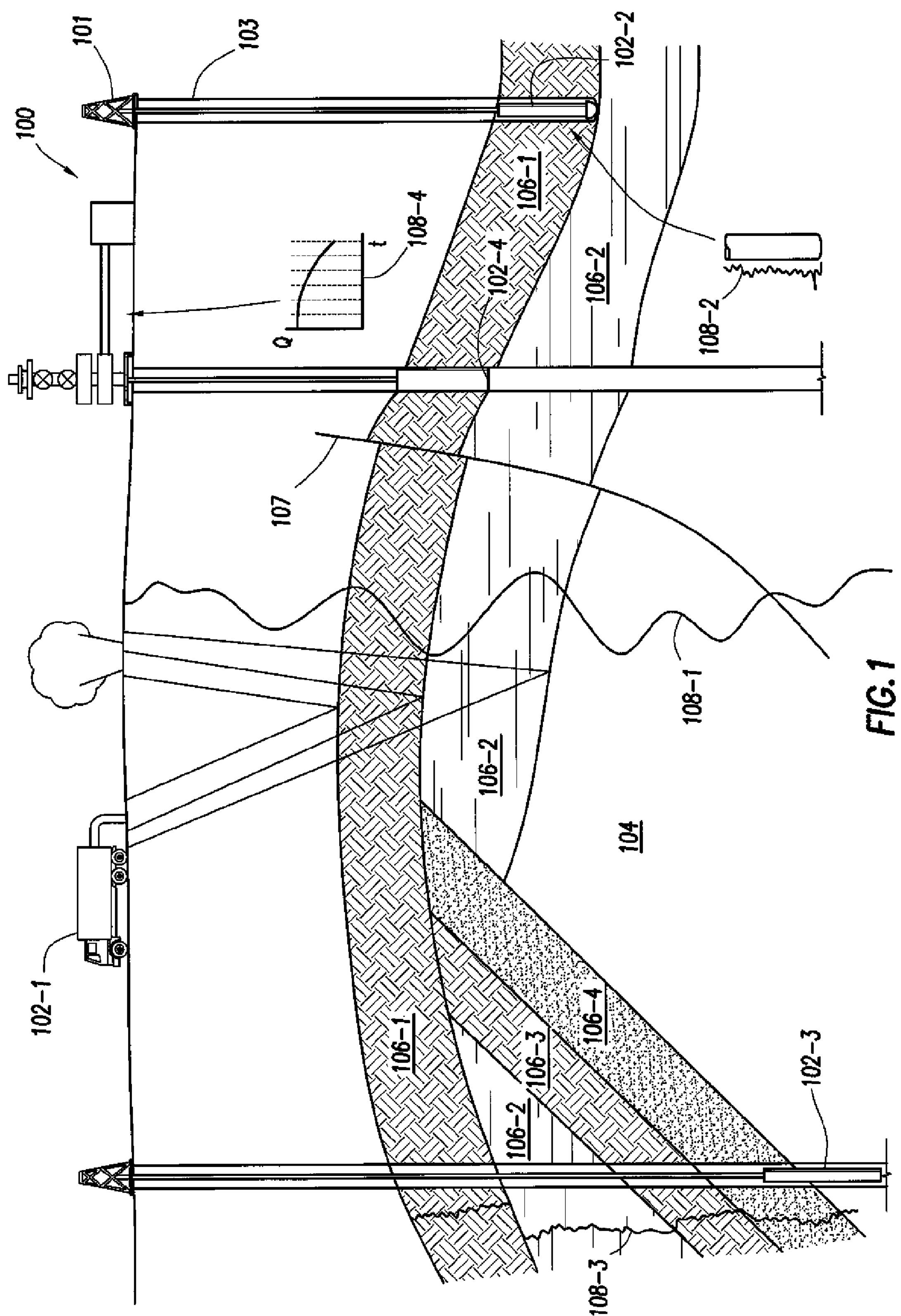
FIG. 1 depicts a schematic view, partially in cross-section, of a field having a plurality of data acquisition tools positioned at various locations along the field for collecting data from the subterranean formation, in which embodiments of phase wellbore steering may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (**106*b***) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit is preferably provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

FIG. 2.1 depicts a system (200) incorporated with a portion of a field, as shown and described above with respect to FIG. 1. As shown, the system (200) includes a surface unit (202) operatively connected to a wellsite drilling system (204), servers (206), and a phase tool (208), which are described in detail below with respect to FIG. 2.2. The portion of the field shows a well being drilled by the wellsite drilling system (204), where the portion of the field includes a gas phase (209), a transition phase (210), and an oil phase (211).

The borehole of the well is depicted as intersecting each of the phases (the gas phase (209), the transition phase (210), and the oil phase (211)) in the portion of the field. Further, the borehole of the well is shown as being drilled horizontally through each of the phases. In this case, the drilling operation is targeting the oil phase (211) and, thus, should be maintained within the oil phase (211) once reached. The surface unit (202) may use the phase tool (208) to maintain the drilling operation within the oil phase (211). Specifically, the phase tool (208) may be configured to use acoustic measurements obtained from LWD tools to signal the surface unit (202) in real time when the drilling operation is steered into the transition phase (210) or gas phase (209). Once the surface unit (202) receives the signal, the drilling operation may be steered downward to avoid the transition phase (210) and/or gas phase (209). Because changes from oil to gas in a reservoir typically occur gradationally, the highly sensitive nature of the acoustic measurements to the presence of gas allow the phase tool (208) to detect the gradational increases and/or decreases in gas during the drilling operation.

FIG. 2.2 depicts a system (200) incorporated with a portion of a field, as shown and described above with respect to FIG. 1. The system (200) may be the same system as described with respect to FIG. 2.1. As shown, the system (200) includes a surface unit (202) operatively connected to a wellsite drilling system (204), servers (206), and a phase tool (208) via an interface (230) on the phase tool (208). The phase tool (208) is also operatively linked, via the interface (230), to the servers (206). The surface unit (202) and wellsite drilling system (204) may include various field tools and wellsite facilities. As shown, communication links are provided between the surface unit (202) and the wellsite drilling system (204), servers (206), and phase tool (208). A communication link is also provided between the phase tool (208) and the servers (206). A variety of links may be provided to facilitate the flow of data through the system (200). For example, the communication links may provide for continuous, intermittent, one-way, two-way and/or selective communication throughout the system (200). The communication links may be of any type, including but not limited to wired and wireless.

In one or more embodiments, the wellsite drilling system (204) is configured to perform oilfield operations as described above with respect to FIG. 1. Specifically, the wellsite drilling system (204) may be configured to perform drilling operations as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. This data may be measured by sensors at the wellsite. This data may also be received from other sources, such as those described with respect to FIG. 1 above.

The controller (214) may be enabled to enact commands at the field. The controller (214) may be provided with actuation means that can perform drilling operations, such as steering, advancing, or otherwise taking action at the wellsite. Commands may be generated based on logic of the processor (218), or by commands received from other sources. In one or more embodiments, the processor (218) is provided with features for manipulating and analyzing the data. The processor (218) may be provided with additional functionality to perform field operations.

In one or more embodiments, a display unit (216) may be provided at the wellsite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (2D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite drilling system (204), the surface unit (202), and/or the phase tool (208).

The servers (206) may be configured to transfer data from a surface unit (202) at one or more wellsites to the phase tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data, historical data, economics data, other field data, and/or other data that may be of use during analysis. The type of server is not intended to limit phase wellbore steering. In one or more embodiments, the system is adapted to function with any type of server that may be employed.

In one or more embodiments, the servers (206) communicate with the phase tool (208) through the communication links. As indicated by the multiple arrows, the servers (206) may have separate communication links with the phase tool (208) and the surface unit (202). One or more of the servers (206) may be combined or linked to provide a combined communication link In one or more embodiments, the servers (206) collect a wide variety of data. The data may be collected from a variety of channels that provide a certain type of data, such as well logs. The data from the servers is passed to the phase tool (208) for processing. The servers (206) may also be configured to store and/or transfer data. For example, the data may be collected at the wellsite drilling system (204) using measurements-while-drilling (MWD) tools, logging-while-drilling (LWD) tools, any other similar types of drilling measurement tools, or any combination thereof. More specifically, the MWD tools and/or LWD tools may be configured to obtain acoustic measurements during drilling of the borehole at the wellsite drilling system (204). The LWD tool may be configured to obtain delta-T compressional measurements, delta-T shear measurements, compressional velocity, and/or shear velocity. For example, the LWD tool may correspond to a full quadrapole shear LWD tool capable of measuring both compressional velocity and shear velocity in real time during a drilling operation.

Those skilled in the art will appreciate that MWD tools are configured to evaluate physical properties during the drilling of a wellbore. A MWD tool may obtain measurements downhole, which may be stored and then transmitted to the surface. In this case, the measurements may be transmitting to the surface as pressure pulses in the mud system (e.g., positive, negative, or continuous sine waves). One skilled in the art will appreciate that MWD tools that measure formation parameters (resistivity, porosity, sonic velocity, gamma ray) are referred to as LWD tools. LWD tools may obtain, store, and transmit measurements as discussed above with respect to MWD tools.

In one or more embodiments, the phase tool (208) is operatively linked to the surface unit (202) for receiving data therefrom. In some cases, the phase tool (208) and/or server(s) (206) may be positioned at the wellsite. The phase tool (208) and/or server(s) (206) may also be positioned at various locations. The phase tool (208) may be operatively linked to the surface unit (202) via the server(s) (206). The phase tool (208) may also be included in or located near the surface unit (202).

In one or more embodiments, the phase tool (208) includes an interface (230), a processing unit (232), a data repository (234), and a data rendering unit (236). In one or more embodiments, the phase unit (248) of the phase tool (208) is configured to monitor downhole properties for borehole steering. More specifically, the phase unit (248) may be configured to use downhole properties obtained by MWD tools and/or LWD tools at the wellsite drilling system (204) to determine an optimal direction for a drilling operation. In this case, the downhole properties may be obtained from the servers (206), where the wellsite drilling system (204) and surface unit (202) are configured to store the downhole properties in the servers (206) in real time.

In one or more embodiments, the phase unit (248) is configured to determine the current phase (e.g., oil phase, gas phase, transition phase, etc.) of a drilling operation using real time acoustic measurements. In this case, the phase unit (248) may determine the current phase by analyzing the acoustic measurements in real time using a crossplot. Specifically, changes in the gas content of the drilling phase may be identified on a compressional to shear velocity ratio ("VPVS") vs. delta-T compressional measurement ("DTCO") crossplot as a deviation from the clean-wet matrix line. For example, an acoustic measurement that deviates from the clean-wet matrix line indicates that the current drilling phase is leaving an oil phase and entering a transitional or gas phase. In another example, as the acoustic measurements normalize with the clean-wet matrix line, the phase tool (248) may determine that the drilling phase is moving from a gas phase to a transitional or oil phase. Those skilled in the art will appreciate that the clean-wet matrix line includes normal compressional values for a phase with a small amount or no gas content (i.e., a water phase). An example of a clean-wet matrix line is described below with respect to FIGS. 3.1-3.3.

In one or more embodiments, the phase unit (248) may be configured to generate an optimal well trajectory based on the current phase. More specifically, the phase unit (248) may generate an optimal well trajectory to maintain a horizontal drilling operation in a target phase. For example, if the phase unit (248) determines that the drilling operation is moving towards a transitional or gas phase, the phase unit (248) generates an optimal well trajectory that steers the drilling operation downward towards an oil phase (i.e., the target phase). In another example, if the phase unit (248) determines that the drilling operation is moving towards a transitional or oil phase, the phase unit (248) generates an optimal well trajectory that steers the drilling operation upwards towards a gas phase (i.e., the target phase). The optimal well trajectory determined by the phase unit (248) may then be used at the surface unit (202) to adjust a drilling operation. In other words, the phase unit (248) may be configured to provide real time feedback, including an optimal well trajectory generated based on an analysis of the acoustic measurements, to the surface unit (202), where a drilling operation may be adjusted at the surface unit (202) accordingly.

Optionally, the phase unit (248) may be configured to continually update an earth model (e.g., a full field numerical model, a geostatistical model, etc.) based on the acoustic measurements. In this case, the phase unit (248) may be configured to generate the optimal well trajectory using the updated earth model. Further, the earth model may initially be generated based on subsurface measurements as described above with respect to FIG. 1.

In one or more embodiments, the interface (230) of the phase tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2.2, the interface (230) selects the data channel of the server(s) (206) and receives the data. In one or more embodiments, the interface (230) also maps the data channels to data from the wellsite. The data may then be passed from the interface (230) to the processing modules (242) of the processing unit (232). In one or more embodiments, the data is immediately incorporated into the phase tool (208) for real time sessions and/or modeling. The interface (230) may create data requests (e.g., surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the phase tool (208). In one or more embodiments, the utility modules (246) include a logging component (not shown) and a user interface (UI) manager component (not shown). The logging component provides a common call for the logging data, which means that the utility modules (246) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (242) into multiple volume data sets for storage and retrieval.

In one or more embodiments, the data repository (234) stores the data for the phase tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit (236) performs rendering algorithm calculations to provide one or more displays for visualizing the data. The displays for visualizing the data may be presented, using one or more communication links, to a user at the display unit (216) of the surface unit (202). The data rendering unit (236) may contain a 2D canvas, a 3D canvas, a well section canvas, or other canvases, either by default or as selected by a user. The data rendering unit (236) may selectively provide displays composed of any combination of one or more canvases. The canvases may or may not be synchronized with each other during display. In one or more embodiments, the data rendering unit (236) is provided with mechanisms for actuating various canvases or other functions in the system. Further, the data rendering unit (236) may selectively provide displays composed of any combination of one or more volume data sets. The volume data sets typically contain exploration and production data.

While specific components are depicted and/or described for use in the units and/or modules of the phase tool (208), it will be appreciated that a variety of components with various functions may be configured to provide the formatting, processing, utility, and coordination functions necessary to process data in the phase tool (208). The components may have combined functionalities and may be implemented as software, hardware, firmware, or suitable combinations thereof.

Further, components (e.g., the processing modules (242), the data rendering unit (236), etc.) of the phase tool (208) may be located in an onsite server (222) or in distributed locations where a remote server (224) and/or a third party server (226) may be involved. The onsite server (222) may be located within the surface unit (202).

FIGS. 3.1-3.3 depict example crossplots for phase wellbore steering. In the examples shown in FIGS. 3.1-3.3, data points representing acoustic measurements are plotted relative to a clean-wet matrix line (302). The clean-wet matrix line includes the normal (i.e., expected) compressional data values representing acoustic measurements of a phase with a small amount or no gas content (i.e., a water phase). In FIG. 3.1, the crossplot (304) includes data points for acoustic measurements obtained while drilling in a water phase (310) and an oil phase (312). The data points for the water phase (310) are plotted near the clean-wet matrix line (302), and the data points for the oil phase (312) are slightly deviated from the clean-wet matrix line (302). In this example, the initial deviation from the clean-wet matrix (302) shown in the data points (312) indicates that the oil phase has been reached during a drilling operation. Once the data points for the oil phase (312) are obtained, the operator may be notified that the current phase of the drilling operation is the oil phase thereby allowing the operator to, if desired, maintain the drilling operation in the oil phase.

In FIG. 3.2, the crossplot (306) includes data points for acoustic measurements obtained while drilling in a transition phase (314). The data points (314) shown in the transition crossplot (306) show further deviation (with respect to the data points for the oil phase (312)) from the clean-wet matrix line. In this example, the further deviation from the clean-wet matrix (302) shown in the data points (314) indicates that the transition phase has been reached during a drilling operation. Once the data points for the transition phase (314) are obtained, the operator may be notified that the current phase of the drilling operation is the transition phase thereby allowing the operator to, if desired, steer the drilling operation towards a target phase.

In FIG. 3.3, the crossplot (308) includes data points for acoustic measurements obtained while drilling in a gas phase (316). The data points (316) shown in the gas crossplot (308) show a substantial deviation from the clean-wet matrix line. In this example, the substantial deviation from the clean-wet matrix (302) shown in the data points (316) indicates that the current phase of the drilling operation is the gas phase.

In FIGS. 3.1-3.3, the sensitivity of acoustic measurements to the gas content of each of the phases is shown. Specifically, as the gas content of a phase increases, the compressional to shear velocity ratio ("VPVS") decreases and the delta-T compressional measurement ("DTCO") increases in relation to the normal compressional data values.

Figure 4:
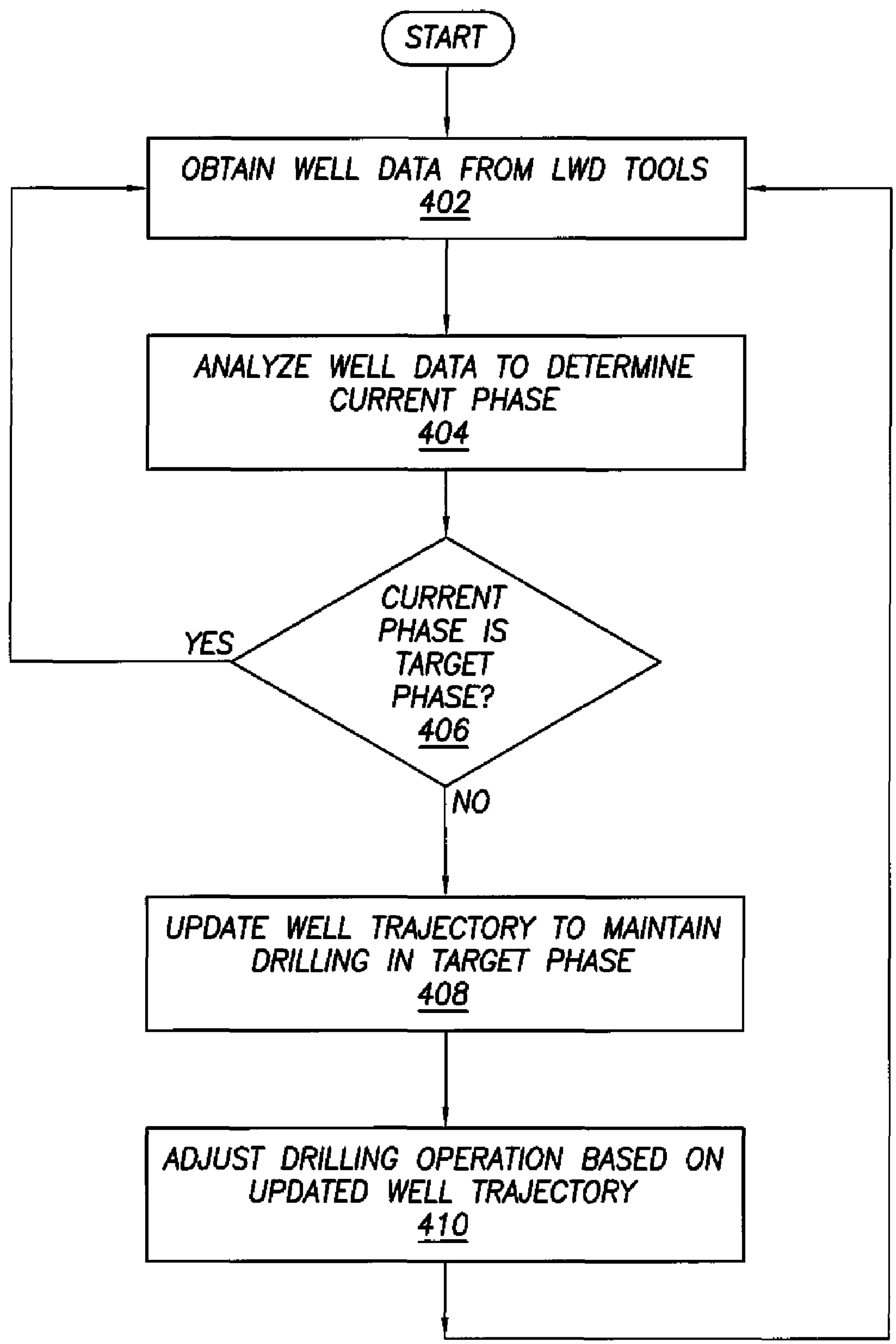
FIG. 4 depicts an example method for phase wellbore steering in accordance with one or more embodiments.

FIG. 4 depicts a flowchart of a method in accordance with one or more embodiments. One or more of the blocks shown in FIG. 4 may be omitted, repeated, and/or performed in a different order. Accordingly, embodiments should not be considered limited to the specific arrangements of blocks shown in FIG. 4.

In one or more embodiments, the method depicted in FIG. 4 may be practiced during a drilling operation as described above with respect to FIGS. 1-2. In block 402, well data is obtained from logging-while-drilling (LWD) tools. The well data may be acoustic measurements obtained at a current depth of the drilling operation including, but not limited to, delta-T compressional measurements, delta-T shear measurements, compressional velocity, and/or shear velocity. In one or more embodiments, a computer, as described with respect to FIG. 5 below, is used to obtain the well data.

In block 404, the well data is analyzed to determine the current phase of a drilling operation. More specifically, the acoustic measurements may be plotted on a compressional to shear velocity ratio ("VPVS") vs. delta-T compressional measurement ("DTCO") crossplot to determine the current phase based on a clean-wet matrix line in real time (i.e., the comparison is performed during the drilling operation associated with the well data). For example, if the target phase is an oil phase, it may be determined that the current phase is changing to a transitional or gas phase when the acoustic measurements begin to deviate from the clean-wet matrix line (i.e., indicating that the gas content of the current phase is increasing). In another example, if the target phase is a gas phase, it may be determined that the current phase is changing to a transitional or oil phase when the acoustic measurements begin to normalize with the clean-wet matrix line (i.e., indicating that the gas content of the current phase is decreasing). In one or more embodiments, a computer, as described with respect to FIG. 5 below, is used to analyze the well data.

Those skilled in the art will appreciate that predetermined thresholds for the acoustic measurements may be used to determine the current phase of a drilling operation. For example, acoustic measurements plotted within a first threshold may be classified as occurring within the oil phase. In this example, acoustic measurements plotted between the first threshold and a second threshold may be classified as occurring within the transition phase. Further, acoustic measurements plotted outside the second threshold may be classified as occurring within the gas phase. The thresholds may be configured based on the gas sensitivity required for the drilling operation.

In block 406, a determination is made as to whether the current phase is the target phase. In the case that the target phase is an oil phase, it may be determined that the current phase is no longer in the target phase (i.e., entering a transitional or gas phase) when the analysis of the acoustic measurements indicate that the gas content of the current phase is increasing. In the case that the target phase is a gas phase, it may be determined that the current phase is no longer in the target phase (i.e., entering a transitional or gas phase) when the analysis of the acoustic measurements indicate that the gas content of the current phase is decreasing. If it is determined that the current phase is the target phase, the method may return to block 402. In one or more embodiments, a computer, as described with respect to FIG. 5 below, is used to determine whether the whether the current phase is the target phase.

In response to determining that the current phase is not the target phase, the well trajectory is updated to maintain the drilling of the borehole in the target phase (block 408). For example, if the target phase is an oil phase, the well trajectory is updated to steer the drilling of the borehole downward. In another example, if the target phase is a gas phase, the well trajectory is updated to steer the drilling of the borehole upward. In another example, an earth model of the drilling operation including a proposed well trajectory may be updated to steer the drilling of the borehole in real time. In one or more embodiments, a computer, as described with respect to FIG. 5 below, is used to update the well trajectory to maintain the drilling operation in the target phase.

In block 410, the drilling operation is adjusted based on the updated well trajectory. The drilling operation may be adjusted using a surface unit as described above with respect to FIGS. 1 and 2. In one or more embodiments, a computer, as described with respect to FIG. 5 below, is used to adjust the drilling operation.

Those skilled in the art will appreciate that blocks 402-410 may be repeated any number of times during a drilling operation. In this case, the drilling operation may be continually adjusted in real time to maintain the drilling of the borehole in the target phase.

Figure 5:
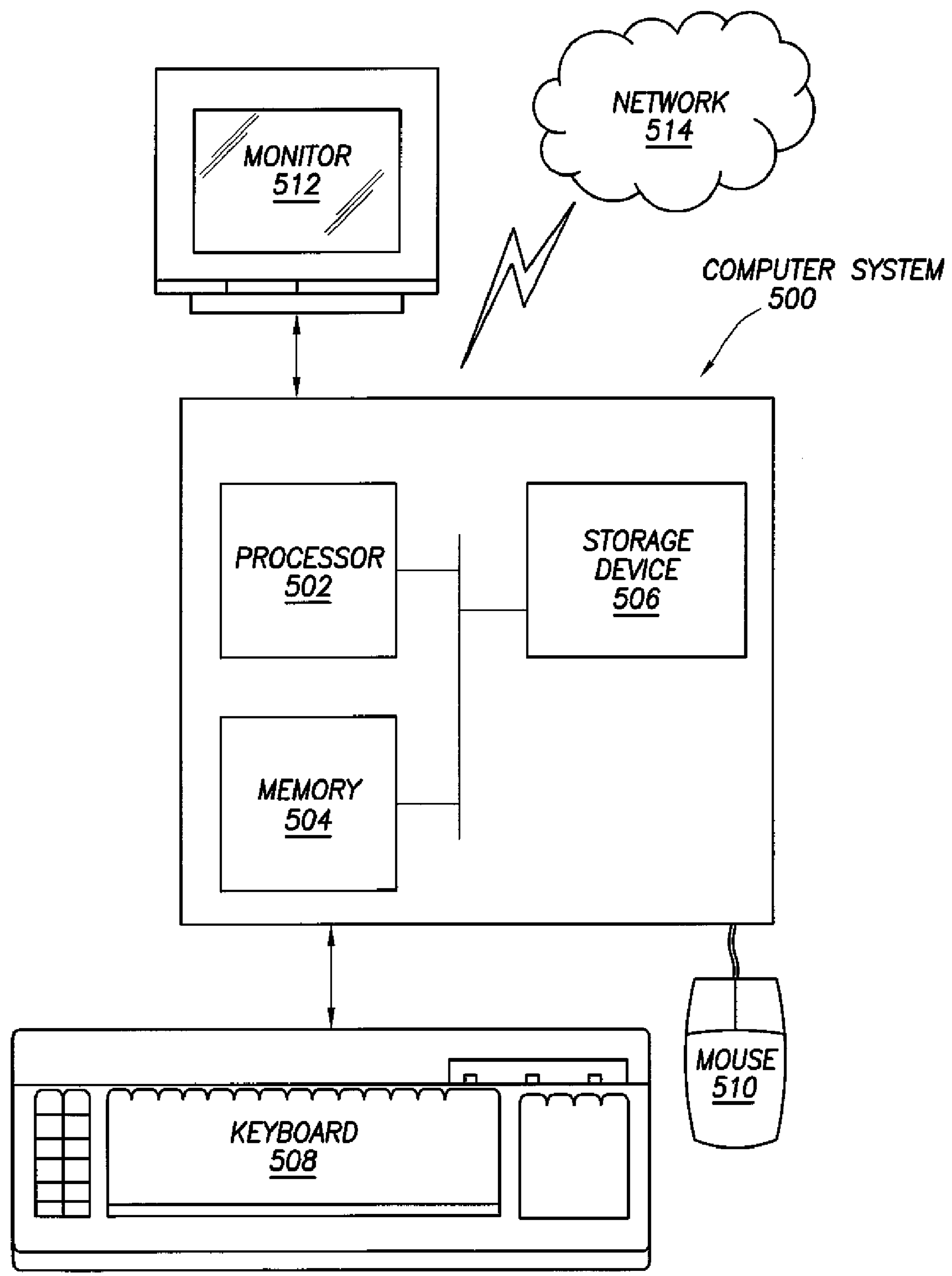
FIG. 5 depicts a computer system in which one or more embodiments of phase wellbore steering may be implemented.

Embodiments of phase wellbore steering may be implemented on virtually any type of computer regardless of the platform being used. For instance, as depicted in FIG. 5, a computer system (500) includes one or more processor(s) (502) such as a central processing unit (CPU) or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display LCD, a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (500) includes at least the minimal processing, input, and/or output means necessary to practice one or more embodiments.

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion of the implementation (e.g., the phase tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While the invention has been described with respect to a limited number of embodiments, those skilled in the art, having benefit of this disclosure, will appreciate that other embodiments may be devised which do not depart from the scope of phase wellbore steering as disclosed herein. Accordingly, the scope of phase wellbore steering should be limited only by the attached claims.

What is claimed is:

1. A method of steering a drilling operation of a well using acoustic measurements, comprising:

obtaining, using a central processing unit (CPU), a clean-wet matrix line for the well, wherein the clean-wet matrix line comprises a plurality of normal compressional values;

obtaining, using the CPU, the acoustic measurements from at least one logging while drilling tool at a current depth of the drilling operation, wherein the acoustic measurements comprise a compressional to shear velocity ratio and a delta-T compressional measurement;

generating an earth model using a plurality of subsurface measurements;

updating the earth model using the compressional to shear velocity ratio and the delta-T compressional measurement to obtain an updated earth model;

determining, using the CPU, a current phase of the drilling operation by comparing the acoustic measurements to the clean-wet matrix line;

in response to determining that the current phase is not a target phase, generating, using the updated earth model, an updated well trajectory for steering the drilling operation toward the target phase; and adjusting the drilling operation using the updated well trajectory.

2. The method of claim 1, wherein the target phase is an oil phase, and wherein the current phase is a transition phase.

3. The method of claim 2, wherein the updated well trajectory steers the drilling operation downward toward the oil phase.

4. The method of claim 1, wherein the current phase is determined based on a deviation of the compressional to shear velocity ratio and the delta-T compressional measurement from the clean-wet matrix line.

5. The method of claim 1, wherein the at least one logging while drilling (LWD) tool comprises a full quadrapole shear LWD tool.

6. The method of claim 1, wherein the well is a horizontal well.

7. A system for steering a drilling operation of a well using acoustic measurements, comprising:

at least one logging while drilling tool configured to obtain the acoustic measurements at a current depth of the drilling operation, wherein the acoustic measurements comprise a compressional to shear velocity ratio and a delta-T compressional measurement;

a phase tool configured to:

obtain a clean-wet matrix line for the well, wherein the clean-wet matrix line comprises a plurality of normal compressional values;

generate an earth model using a plurality of subsurface measurements;

update the earth model using the compressional to shear velocity ratio and the delta-T compressional measurement to obtain an updated earth model;

determine a current phase of the drilling operation by comparing the acoustic measurements to the clean-wet matrix line;

in response to determining that the current phase is not a target phase, generate, using the updated earth model, an updated well trajectory for steering the drilling operation toward the target phase; and a controller configured to adjust the drilling operation using the updated well trajectory.

8. The system of claim 7, wherein the target phase is an oil phase, and wherein the current phase is a transition phase.

9. The system of claim 8, wherein the updated well trajectory steers the drilling operation downward toward the oil phase.

10. The system of claim 7, wherein the current phase is determined based on a deviation of the compressional to shear velocity ratio and the delta-T compressional measurement from the clean-wet matrix line.

11. The system of claim 7, wherein the at least one logging while drilling (LWD) tool comprises a full quadrapole shear LWD tool.

12. The system of claim 7, wherein the well is a horizontal well.

13. A computer readable medium storing instructions for steering a drilling operation of a well using acoustic measurements, the instructions when executed causing a processor to:

obtain a clean-wet matrix line for the well, wherein the clean-wet matrix line comprises a plurality of normal compressional values;

obtain the acoustic measurements from at least one logging while drilling tool at a current depth of the drilling operation, wherein the acoustic measurements comprise a compressional to shear velocity ratio (VPVS) and a delta-T compressional measurement (DTCO);

generate an earth model using a plurality of subsurface measurements;

update the earth model using the compressional to shear velocity ratio and the delta-T compressional measurement to obtain an updated earth model;

determine a current phase of the drilling operation based on a deviation of the acoustic measurements from the clean-wet matrix line;

in response to determining that the current phase is not a target phase, generate, using the updated earth model, an updated well trajectory for steering the drilling operation toward the target phase; and adjust the drilling operation using the updated well trajectory.

14. The computer readable medium of claim 13, wherein the target phase is an oil phase, and wherein the current phase is a transition phase.

15. The computer readable medium of claim 14, wherein the updated well trajectory steers the drilling operation downward toward the oil phase.

16. The computer readable medium of claim 13, wherein the at least one logging while drilling (LWD) tool comprises a full quadrapole shear LWD tool.

17. The computer readable medium of claim 13, wherein the well is a horizontal well.

* * * * *